Aug. 31, 1926.
D. J. KING ET AL
1,598,083
BRAKE PIPE COUPLING
Filed Sept. 9, 1925
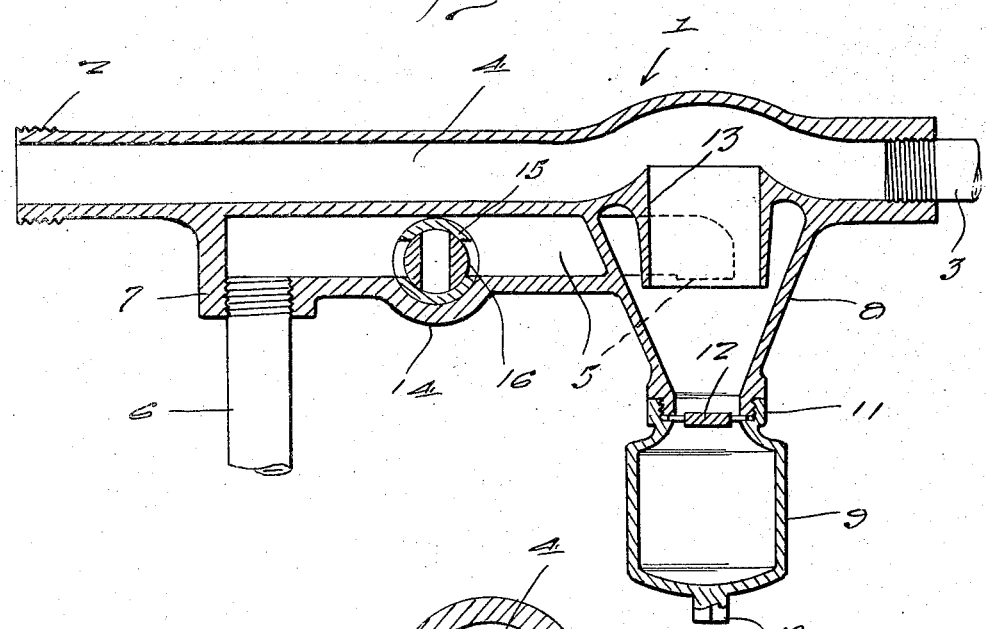
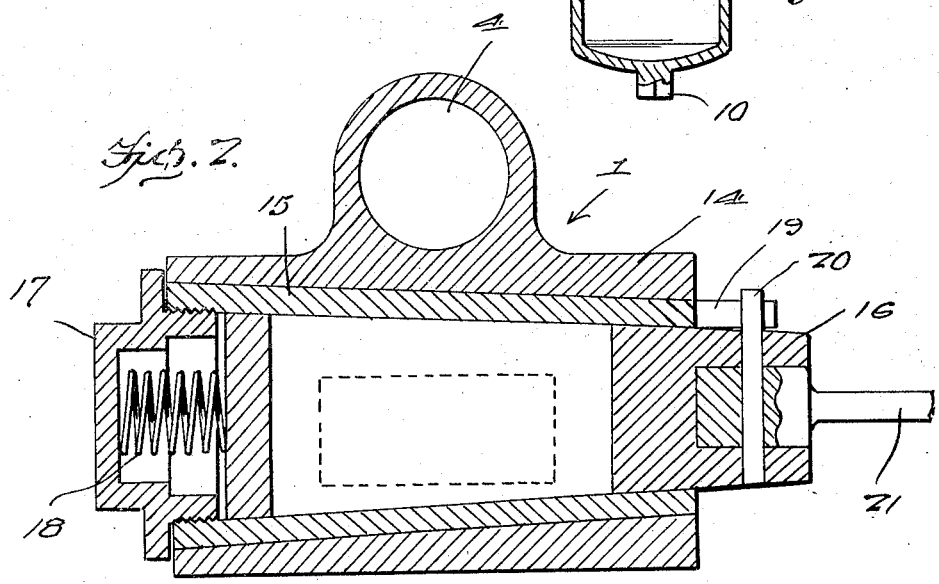
Inventors
D. J. King
W. B. Martin
By Clarence A. O'Brien
Attorney Patented Aug. 31, 1926.

1,598,083

UNITED STATES PATENT OFFICE.

DECATOR J. KING AND WILLIAM B. MARTIN, OF TAYLOR, TEXAS.

BRAKE-PIPE COUPLING.

Application filed September 9, 1925. Serial No. 55,304.

This invention relates to an improved article of manufacture which may be broadly referred to as a brake pipe coupling, the same being adapted to take the place of the ordinary T-coupling employed upon locomotive and car brake pipes.

Our primary aim is to provide a simple and inexpensive device serving as an effective substitute for the brake pipe T, cut out cock, and the dirt collector, three devices now used in association with the brake pipe.

Under the construction of devices at present provided, approximately seven pipe connections are necessary when installing the same. It follows that it is the principal object here to provide a construction which will permit installation requiring only three pipe connections.

Other features and advantages of the invention will become apparent from the following description and drawing.

In the accompanying drawing forming a part of this application and in which like numerals are employed to designate like parts throughout the same:—

Figure 1 is a view in section and elevation showing a device constructed in accordance with the present invention.

Figure 2 is an enlarged transverse section through the cut off valve or cock.

Referring to the drawing in detail it will be seen that the improved device comprises, in the main, a single metallic casting generally designated by the reference character 1. This casting is formed with an externally screw threaded portion 2 for connection of the customary swivel nut. The opposite end is internally screw threaded for connection of the train line pipe 3. Between these threaded portions the casting is enlarged somewhat, and is cored out to provide parallel passages 4 and 5, the first named of which forms a part of the train line, and the second one of which is in connection with the triple valve (not shown) by way of the pipe 6. This pipe 6 is threaded into a nipple formed as at 7. Between the connection for the train pipe 3 and at the end of the passage 5, the casting is formed with a downwardly tapered portion 8 forming what may be conveniently termed a dirt collecting chamber. The lower end of this portion 8 is reduced and screw threaded to provide an attaching neck for a detachable dirt collecting receptacle 9. The receptacle may be of any appropriate external configuration, the same being formed on its bottom with a polygonal enlargement or extension 10 for engagement of a wrench and the upper end being formed with a coupling 11, connected with said threaded neck. Arranged between this receptacle and said neck is a rotary damper or valve 12, having diametrically opposite trunnions rotatably mounted in appropriate bearings. At the juncture of the part 8, and the passage 4, the bottom of the passage is bowed upwardly somewhat, and is formed with a relatively large opening from which a guard sleeve 13 extends. The sleeve extends slightly below the dotted line portion of the passage 5.

The intermediate portion of the passage 5 is formed as at 14 to accommodate a rotary valve. The valve embodies a bushing 15 in which the turn plug 16 is rotatably mounted. The bushing is internally screw threaded at one end, and a cap 17 is detachably connected therewith, this cap constituting a retainer for a coiled spring 18 which presses the plug in tight engagement with the tapered seat formed on the interior of the bushing 15. It is noted that the bushing is formed with outstanding lugs 19 between which the upper end of a retaining pin 20 extends. This retaining pin constitutes a connection for the head portion of the operating handle 21.

From the foregoing description it will be seen that we have evolved a novel brake pipe appliance which can be incorporated in the train pipe line in a manner to eliminate the unnecessary number of pipe connections necessary with the equivalent devices now in use. Whereas approximately seven pipe connections are necessary in the present day constructions, the improved structure calls for but three pipe connections, one leading from the triple valve, and the connections with the opposite end portions of the main train line passage. In a sense the improved structure forms a three in one safety device, which operates quite as efficiently, if not more so, than the structure at present used. No doubt, those familiar with devices of this kind will appreciate the advantages accruing from a structure of this kind. Moreover a clear comprehension of the invention will be had by considering the description in connection with the accompanying drawing. Therefore, a more lengthy description is unnecessary.

While the preferred embodiment of the invention has been shown and described, it is to be understood that minor changes coming within the field of invention claimed may be resorted to if desired.

Having thus described the invention, what is claimed as new is:—

1. A device of the class described comprising a single casting formed to provide parallel communicating passages, one of which is in communication with the train-line, and the other one of which is in communciation with a triple valve, said casting being designed to require but three pipe connections for installation of the same.

2. An appliance of the class described comprising a single casting embodying a train line passage, a triple valve passage, and a dirt collecting chamber.

3. An appliance of the class described comprising a single casting embodying a train line passage, a triple valve passage, and a dirt collecting chamber, said dirt collecting chamber being formed by a downwardly tapered portion constructed at its lower end for detachable connection of a dirt collecting receptacle.

4. An appliance of the class described comprising a single casting constructed to form a main train line passage, an auxiliary triple valve passage disposed in parallelism with the first named passage, and a downwardly tapered part affording communication between said passages, said part functioning as a dust and dirt collecting chamber, and there being internal open ended sleeves disposed therein to function as a separator between said passages.

5. In a brake pipe appliance of the class described, a coupling in the form of a casting, said casting being provided with a main passage with connections at its ends for pipe connections, being further formed below said main passage with an auxiliary passage, at one end of which is a pipe connection, and at the opposite end of which is a depending downwardly tapered shell, there being a separator sleeve formed internally in said shell, said shell being screw threaded at its bottom, a dirt collecting receptacle detachably connected to the screw threaded bottom of the shell, a damper located between said shell and said receptacle and a cut off valve located in said second named passage between the pipe connection and shell.

In testimony whereof we affix our signatures.

DECATOR J. KING.
WILLIAM B. MARTIN.